D. J. NUTT.
LOCK FOR MOTOR VEHICLES.
APPLICATION FILED JAN. 19, 1916.
1,216,351. Patented Feb. 20, 1917.
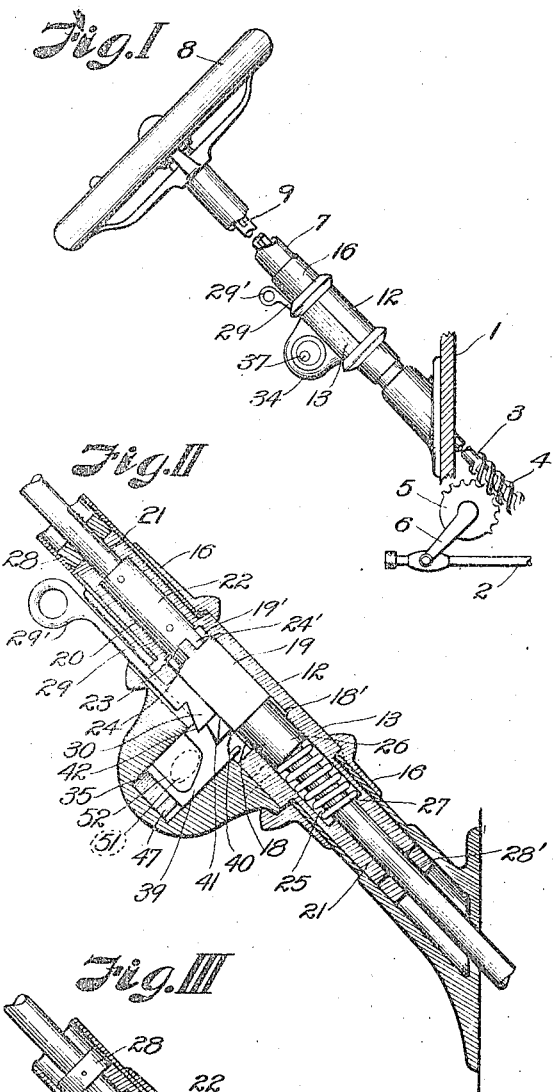
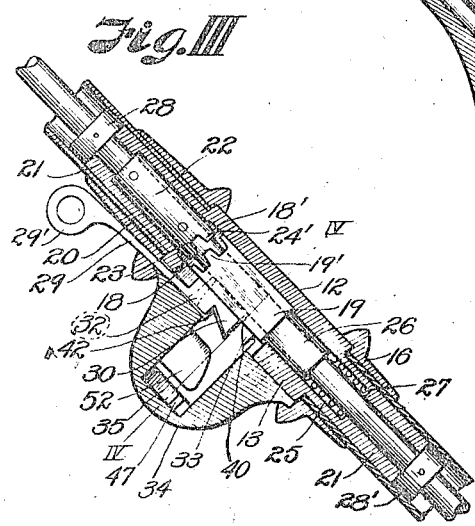
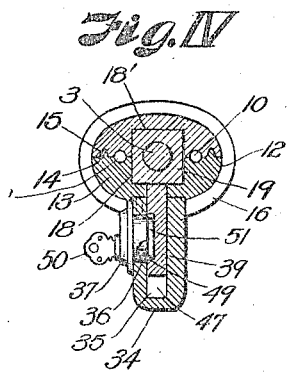
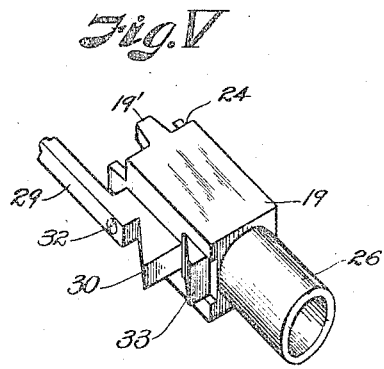
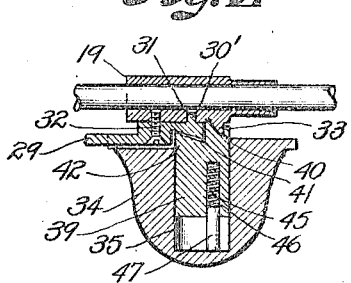
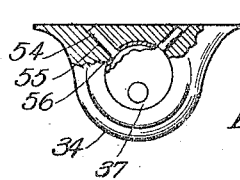
INVENTOR
Daniel J. Nutt.
BY
ATTORNEY

UNITED STATES PATENT OFFICE.

DANIEL J. NUTT, OF KANSAS CITY, MISSOURI, ASSIGNOR OF ONE-HALF TO JAMES E. CROSBY, OF KANSAS CITY, MISSOURI.

LOCK FOR MOTOR-VEHICLES.

1,216,351.  Specification of Letters Patent.  Patented Feb. 20, 1917.

Application filed January 19, 1916. Serial No. 72,931.

*To all whom it may concern:*

Be it known that I, DANIEL J. NUTT, a citizen of the United States, residing at Kansas City, in the county of Jackson and State of Missouri, have invented certain new and useful Improvements in Locks for Motor-Vehicles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a lock for steering mechanism, and more particularly to a device for holding the steering rod of a motor driven vehicle in fixed position, the principal object of the invention being to prevent unauthorized operation or theft of the vehicle equipped with the lock.

In accomplishing this object I have provided improved details of structure, the preferred forms of which are illustrated in the accompanying drawings, wherein:—

Figure I is a side elevation of a steering mechanism of any ordinary type, equipped with my improved lock.

Fig. II is a longitudinal section of the same, showing the parts in locked relation.

Fig. III is a similar view showing the parts in operative relation.

Fig. IV is a cross section on the line IV—IV, Fig. III.

Fig. V is an enlarged detail perspective view of the shifting clutch member.

Fig. VI is a sectional detail view of the steering rod, the shift clutch member and the lock bolt.

Fig. VII is a side elevation of the lock boss, a part being broken away to illustrate the means for anchoring a lock in the boss.

Referring more in detail to the drawings:—

1 designates the dash of a motor driven vehicle, 2 a connecting rod, 3 a steering rod, having operative connection with the rod 3 through a worm 4 on the rod and the worm wheel 5 that is connected with the rod through a crank 6, 7 a post for the steering post, 8 a steering wheel and 9—10 throttle and ignition spark control rods which may be suitably connected respectively with throttle and ignition spark devices and with hand levers (not shown) on the steering wheel, the parts mentioned being of any ordinary construction and included in the description and drawings merely to give a better understanding of my improvements and without any intention of limiting the improvements to this particular structure.

Interposed in the housing 7 is a casing 12 through which the steering rod 3 extends and within which it is rotatably mounted and which preferably comprises the split body 13, the members of which are anchored together by tongues 14 and grooves 15 in the respective members, and the ferrules 16 which serve as anchors to the body and for ornamenting the structure. The casing 12 is preferably oval in cross section to obviate rotary movement of the split body and retain the inclosed parts in functional position.

The casing body members contain longitudinal, squared grooves 18—18' having semi-circular end portions 21, and slidably mounted in the squared portions of said grooves is a clutch block 19, having a central bore within which the steering rod 3 is projected and rotatably mounted. At the upper end of said squared channel is an enlarged circular channel section 20, which is concentric with the channel 21 through which the steering rod projects, but of slightly greater diameter than the part 21 in order to snugly house a sleeve 22 which is fixed on the steering rod and provided with a clutch face 23 at its lower end, the said clutch face being projected into the squared portions of the socket 18—18' of the body and adapted for coöperation with the clutch face 24 on the upper end of the sliding clutch block 19.

The clutch faces of the members 19 and 22 preferably comprise squared teeth 19'—24' so that when the movable clutch member is moved into coöperation with its mating member the teeth mesh to hold the parts firmly together, it being apparent that as the sleeve 22 is fixed on the steering rod and the block 19 slidably mounted thereon, but held against rotary movement in the casing body, when the teeth are in mesh the steering rod will be held against rotation because of the locked relation of the sliding clutch block to the casing.

The socket 18—18' is extended downwardly beyond the end of the body of the clutch block to form a socket 25 that is preferably circular in cross section, and the block 19 is provided with a circular extension 26 that is adapted for sliding in the said socket. Seated on the base of the socket and bearing against the end of the extension 25 is an expansion spring 27 which yieldingly urges the clutch block outwardly toward the sleeve 22, so that when unrestrained the clutch block will be in engagement with the rod sleeve and hold the steering rod in fixed position.

While the clutch block 19 may shift longitudinally along the rod and the rod may rotate in the block, neither the rod nor the split casing member has longitudinal movement, the rod being anchored by its connection with the steering parts and the split member by end collars 28—28' that are fixed to the rod at opposite ends of said members.

Fixedly mounted on the clutch block 19 and extending along the casing 12, is a positioning member 29, having a grip 29' at its outer end and having teeth 30 on the outer face of its inner end, into which mating teeth of a lock bolt may be projected, as presently described, the preferred construction of this part comprising an ear 30' that projects into the socket 31 in the clutch block, and a screw 32 by which the positioning member may be attached to the block, the block itself being provided with a tooth 33 at the end of the positioning member which is also adapted for coöperation with the lock bolt.

Mounted on the casing 12, preferably by means of the ferrules 16 is a lock boss 34, having a chamber 35 opening inwardly to the interior of the clutch casing, and having a recess 36 in one side for carrying a lock 37. Slidably mounted in said chamber is a bolt 39, having sockets 40—41—42 on its inner end adapted for receiving the teeth 30—33 on the sliding clutch block, to hold the block in fixed position, it being apparent that the sockets 40—41 may simultaneously house the teeth (Figs. III-VI) to hold the block in unlocked position, or that the teeth may engage in the sockets 41—42 when the block is advanced to locked position, in order to hold the parts in that relation.

A bolt 39 is contained within the chamber 35 and yieldingly projected toward the block by a spring 45 that seats in a socket 46 in the outer end of the bolt and bears against the base of the socket and against the end of a pin 47 which rests within the housing lock boss and is projected into the socket 46 to guide the socket during its inward or outward movement under tension of the spring or pressure of the lock cam.

The lock 37 may be of any suitable type, and comprises a pin 49 that is rotatable by a key 50 and carries a cam 51 at its inner end to seat in a cam socket 52 in the adjacent face of the bolt 39, so that when the key is moved in either direction the cam member will engage the face of the socket and move the bolt accordingly to locking or unlocking engagement with the shifting clutch member.

The lock 37 is preferably anchored in the boss 34 by dowel pins 54 that extend through apertures 55 in the boss into sockets 56 in the lock to hold the lock in proper relation to the bolt 39.

Assuming that the parts are constructed and assembled as described, and the vehicle in operation, the lock bolt 39 will be drawn and the sliding clutch block 19 spaced from the mating sleeve 22 (Fig. III) so that the steering rod may turn freely to operate the car in the ordinary manner. Should it be desired to lock the car the operator places the key in the lock and turns the pin to move the cam member against the cam face of the bolt socket, and moves the bolt outwardly against the tension of its spring.

As soon as the bolt is drawn the spring 27 shoots the sliding clutch member upwardly into clutch engagement with the sleeve 22 that is fixed on the upper portion of the steering rod, the rod being turned slightly in either direction, if necessary, in order to permit the clutch teeth to mesh. The bolt is then again shot by the lock key to permit the sockets therein to receive the teeth on the sliding clutch member. The sliding clutch member is then held in fixed relation and in clutch engagement with the sleeve 22.

With the parts in this relation, should an unauthorized person attempt to operate the vehicle, it will be impossible for him to move the steering mechanism, as the steering rod is locked to the sliding clutch block and the latter, having squared fitting within the fixed housing, cannot turn, so that the vehicle could not be steered.

When the operator wishes to start the vehicle he again draws the bolt by means of the key mechanism to free the sliding clutch member, moves the positioning arm 29 backwardly to shift the sliding clutch member away from the sleeve, and, when the clutch member is in open position, shoots the bolt to reëstablish the locking relation thereof with the sliding clutch member and hold the latter in spaced relation to the mating clutch sleeve. The vehicle may then be operated in the usual manner.

It is apparent that with this construction the vehicle is safeguarded against unauthorized use or theft, as it will be impossible for a person to remove the car because of his inability to steer the same when the steering rod is locked. It is also apparent that the locking or unlocking may be effected easily and quickly and that the probability of the parts becoming accidentally displaced is remote because of the positive locking engagement of the bolt with the sliding clutch member.

Having thus described my invention, what I claim as new therein, and desire to secure by Letters-Patent, is:—

1. A lock for motor vehicles, comprising a steering post, a rotatable rod extending through said post, a clutch member fixed on the rod, a clutch member slidable on the rod and adapted for coöperation with the first named clutch member, means for holding said sliding clutch member to prevent rotation of the rod when said member is in coöperative relation with the fixed clutch member, means extending to the exterior of the post for actuating said sliding member, and a lock for said actuating means.

2. In a lock for motor vehicles, the combination with a steering post, of a rod extending through and rotatably mounted in said post, a clutch member fixed on the rod, a clutch member slidably mounted on the rod, yielding means for urging the sliding clutch member toward its mate, a positioning member fixed to said sliding member and extending to the exterior of the post, a lock for said positioning member and means for holding said sliding clutch member against rotation on the post.

3. In a lock for motor vehicles, the combination with a steering post and rod, of fixed and sliding clutch members on said rod, one of the clutch members being revoluble and the other non-revoluble on the rod, a spring for urging the sliding member toward its mate, a positioning member attached to the sliding clutch member and extending to the exterior of the post, and a lock comprising a bolt adapted for movement to engagement by the positioning member to prevent the return of the sliding clutch member.

4. The combination with a steering post, of a casing on said post having a squared channel therein, a sleeve fixed on the post and having a clutch end, a squared block slidably mounted in the squared channel and having a clutch face adapted for coöperative engagement with the face on said sleeve, means for positioning said sliding clutch member, and a bolt for engaging said member to hold the same in selected position.

5. The combination with a steering post, of a housing inclosing said post and having a squared channel therein, a clutch face fixed on the post, a clutch member slidably mounted in said channel and having a clutch face adapted for coöperation with the fixed face, a spring for urging the sliding member in one direction, a positioning member for moving the sliding member against the tension of its spring, and a lock comprising a bolt for holding engagement with the sliding member when the latter is in selected position.

6. The combination with a steering post, of a housing inclosing a portion of said post, a clutch face on the post within the housing, a clutch member slidably mounted on the post within the housing and having a clutch face adapted for coöperation with the face on the fixed member, teeth on said movable clutch member, a positioning member extended to the exterior of the housing, a bolt movable toward and from the movable clutch member and having teeth adapted for coöperation with the teeth on said member, to hold said member in selected position, and key operated mechanism for actuating said bolt.

7. The combination with a steering post, of a housing inclosing a portion of said post, a clutch face on the post within the housing, a clutch member slidably mounted on the post within the housing and having a clutch face adapted for coöperation with the face on the fixed member, teeth on said movable clutch member, a positioning member extended to the exterior of the housing, a bolt adapted for movement toward and from the movable clutch member and having teeth adapted for coöperation with the teeth on said member and having a cam socket, and key actuated mechanism comprising a cam adapted for movement in said socket to trip the bolt.

8. The combination with a steering post, of a housing inclosing a portion of said post, a clutch face on the post within the housing, a clutch member slidably mounted on the post within the housing and having a clutch face adapted for coöperation with the face on the fixed member, teeth on said movable clutch member, a positioning member extended to the exterior of the housing, a bolt adapted for movement toward and from the movable clutch member and having teeth adapted for coöperation with the teeth on said member and having a cam socket, key actuated mechanism comprising a cam adapted for movement in said socket to shift the bolt, and yielding means for urging the bolt to locking engagement with said clutch member.

In testimony whereof I affix my signature.

DANIEL J. NUTT.